United States Patent
Bouvigne et al.

(10) Patent No.: US 9,681,260 B2
(45) Date of Patent: Jun. 13, 2017

(54) DEVICE SELECTION FOR USER INTERFACE

(71) Applicant: Cisco Technology Inc., San Jose, CA (US)

(72) Inventors: Gabriel Bouvigne, Nanterre (FR); Laurent Gardes, Meudon (FR)

(73) Assignee: Cisco Technology, Inc., San Jose, CA (US)

( * ) Notice: Subject to any disclaimer, the term of this patent is extended or adjusted under 35 U.S.C. 154(b) by 798 days.

(21) Appl. No.: 13/941,838

(22) Filed: Jul. 15, 2013

(65) Prior Publication Data

US 2015/0019577 A1  Jan. 15, 2015

(51) Int. Cl.
*G06F 7/00* (2006.01)
*G06F 17/30* (2006.01)
*H04W 4/02* (2009.01)
*H04W 48/18* (2009.01)
*H04W 48/16* (2009.01)

(52) U.S. Cl.
CPC .............. *H04W 4/02* (2013.01); *H04W 48/16* (2013.01); *H04W 48/18* (2013.01); *G06F 7/00* (2013.01); *G06F 17/30312* (2013.01)

(58) Field of Classification Search
CPC . G01S 19/48; G01S 5/02; G01S 19/12; G01S 19/46; G01S 5/0018; G01S 5/0027; H04W 4/028; H04W 4/12; H04W 4/206; H04W 52/54; H04W 4/008; H04W 4/16; H04W 4/20; H04W 52/245; H04W 64/00; H04W 4/02; H04W 4/023; H04M 1/7253; H04L 1/20; H01Q 1/1257; H04B 17/318
See application file for complete search history.

(56) References Cited

U.S. PATENT DOCUMENTS

| | | | |
|---|---|---|---|
| 6,269,246 B1 | 7/2001 | Rao et al. | |
| 7,042,391 B2 | 5/2006 | Meunier et al. | |
| 7,194,278 B1 | 3/2007 | Cook | |
| 8,140,094 B2 | 3/2012 | Morgan et al. | |
| 2006/0246887 A1* | 11/2006 | Barclay et al. | ............. 455/423 |
| 2008/0039114 A1* | 2/2008 | Phatak | ............. G01S 5/0252 455/456.1 |
| 2010/0290359 A1* | 11/2010 | Dewey | ............. G05B 19/4185 370/252 |
| 2011/0230209 A1 | 9/2011 | Kilian | |
| 2012/0066035 A1 | 3/2012 | Stanger et al. | |

(Continued)

*Primary Examiner* — Jason Liao
*Assistant Examiner* — Berhanu Mitiku
(74) *Attorney, Agent, or Firm* — Samuel M. Katz

(57) ABSTRACT

A system including a processor to create a history database in a storage medium for storing signal strength history records, each history record including an indication of one or more signals and a signal strength for each of the one or more signals detected by a mobile device, each of the history records being mapped to a rendering device, receive a first signal strength record, compare the first signal strength record to at least some of the history records to find one of the at least some history records which is a sufficiently close match to the first signal strength record, wherein the sufficiently close matching history record is mapped to a first rendering device, select the first rendering device for the user interface software to send control commands to, and store the first signal strength record in the history database mapped to the selected rendering device.

18 Claims, 5 Drawing Sheets

(56) References Cited

U.S. PATENT DOCUMENTS

| | | |
|---|---|---|
| 2012/0131094 A1 | 5/2012 | Lyons et al. |
| 2012/0190386 A1 | 7/2012 | Anderson |
| 2012/0215640 A1 | 8/2012 | Ramer et al. |
| 2014/0171107 A1* | 6/2014 | Kao .................... G01C 21/206 455/456.1 |

* cited by examiner

DEVICE SELECTION FOR USER INTERFACE

FIELD OF THE INVENTION

The present invention relates to linking a user interface running on a mobile device to a device to be controlled from a selection of devices.

BACKGROUND OF THE INVENTION

The following references are believed to represent the state of the art:

US Published Patent Application 2011/0230209 of Kilian;

US Published Patent Application 2012/0066035 of Stranger, et al.;

US Published Patent Application 2012/0131094 of Lyons, et al.;

US Published Patent Application 2012/0190386 of Anderson;

US Published Patent Application 2012/0215640 of Ramer, et al.;

U.S. Pat. No. 6,269,246 to Rao, et al.;

U.S. Pat. No. 7,042,391 to Meunier, et al.;

U.S. Pat. No. 7,194,278 to Cook; and

U.S. Pat. No. 8,140,094 to Morgan, et al.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
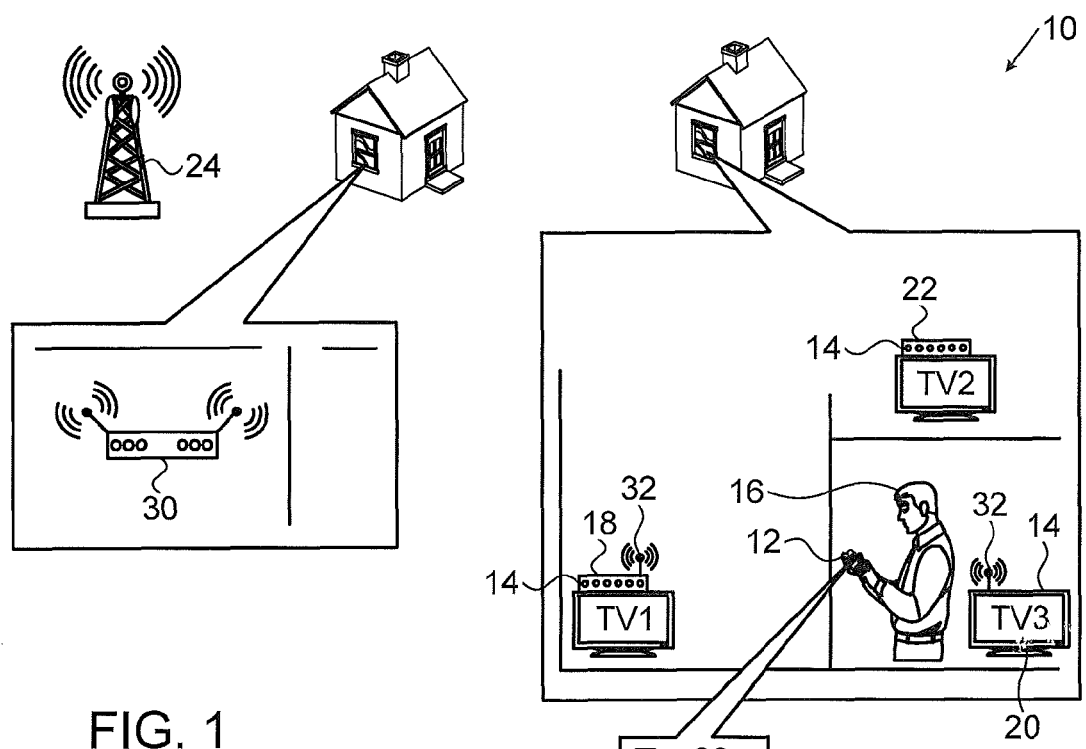
FIG. 1 is a partly pictorial, partly block diagram view of a rendering device selection system constructed and operative in accordance with an embodiment of the present invention.

Reference is now made to FIG. 1, which is a partly pictorial, partly block diagram view of a rendering device selection system 10 constructed and operative in accordance with an embodiment of the present invention.

The rendering device selection system 10 is typically implemented in an environment including a mobile device 12 and a plurality of rendering devices 14 located in a plurality of different locations. The mobile device 12 typically includes user interface software for selectively sending control commands to any one of the rendering devices 14 so that a user 16 may interact with any one of the rendering devices 14 at any one time.

In overview, the rendering device selection system 10 is operative to select which of the rendering devices 14 the mobile device 12 will send the control commands to at any one time without requiring constant input from the user 16 as to which of the rendering devices 14 the user 16 wants to the user interface software to send commands to. The mobile device 12 is operative to detect one or more wireless signals 26 and the signal strength 28 of each of the wireless signals 26 creating a signal strength record 34 at a particular location and time. The form of the signal strength record is an indication of which of the rendering devices 14 should be selected for the mobile device 12 to send the control commands to. The rendering device selection system 10 selects the rendering device 14, for sending the control commands to, based on matching the signal strength record 34 of the one or more signals 26 detected by the mobile device 12 at the current location against a dynamic history of signal strength records. The comparison may be performed against all the signal strength history records or only a subset of them. For example, it may be sufficient to find a signal strength history record with a close enough match without comparing the signal strength record 36 to the remaining signal strength history records. The user 16 is provided the ability to manually override the selected rendering device 14. Manual overriding (or not) creates feedback to the rendering device selection system 10, which uses this information to adjust or enrich the history of signal strength records. Therefore, the rendering device selection system 10 is constantly re-evaluating the history using information from user interactions, improving precision over time and able to cope with addition or removal of new wireless signals. The rendering device selection system 10 does not need to determine the location of the mobile device 12, does not need knowledge of a floor plan in a region of the mobile device 12 and does not need to know the location of each of the rendering devices 14.

The operation of the rendering device selection system 10 is now described in more detail.

The rendering devices 14 may include any suitable rendering device, for example, but not limited to, a WiFi enabled set-top box 18 (connected to a TV, "TV1") or an internet enabled set-top box 22 (connected to a TV, "TV2") or a WiFi enabled television 20 ("TV3") or a game console (not shown) or a computer system (not shown) or any other suitable media device which is enabled to receive and process control commands from the mobile device 12.

The mobile device 12 may be any suitable mobile device, for example, but not limited to a mobile phone or a slate device. The mobile device 12 is typically WiFi enabled and/or configured for connection to a cellular network. The WiFi and/or cellular connectivity may enable connection to another local or remote network, for example, but not limited to, a LAN or Internet. The mobile device 12 may send control commands to the WiFi enabled set-top box 18 via a WiFi connection and control commands to the internet enabled set-top box 22 via an Internet connection available via a cellular communication network via a cellular communication tower 24, by way of example only.

The rendering devices 14 may include one or more rendering devices which are connected to a home network (LAN) and the home network includes one or more WiFi access points (not shown) so that the mobile device 12 may send control commands to the LAN connected rendering devices 14 via the WiFi access points.

The control commands may include any suitable control command, for example, but not limited to, TV channel zapping, programming a recording, game control, volume control, triggering playback of a recording and navigating a playlist.

The mobile device 12 is typically operative to detect wireless the signals 26 and the signal strength 28 of each of the wireless signals 26. The wireless signals 26 may include more than one type of wireless signal, for example, but not limited to, a WiFi signal from a wireless router 30 or a wireless transceiver 32 or a cellular signal from the cellular communication tower 24 or a femtocell.

At any one time, typically when the user 16 interacts with the user interface software, the mobile device 12 is operative to provide the signal strength record 34 including an indication of the signals 26 and the signal strength 28 of each of the signals 26. It should be noted that the signal strength record 34 may include just a single signal 26.

Figure 2:
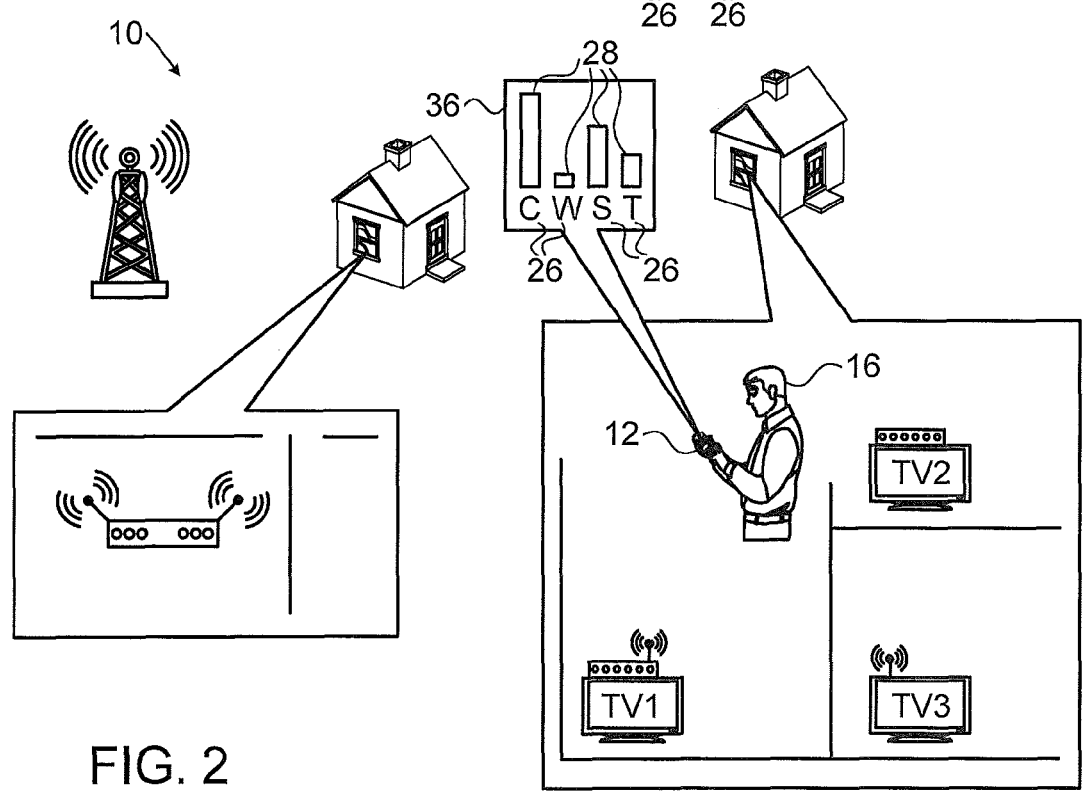
FIG. 2 is a partly pictorial, partly block diagram view of the rendering device selection system of FIG. 1 with a mobile device in a different location.

Reference is now made to FIG. 2, which is a partly pictorial, partly block diagram view of the rendering device selection system 10 of FIG. 1 with the mobile device 12 in a different location.

The user 16 has now moved to a new location. The mobile device 12 detects the signals 26 and the signal strength 28 of the signals 26. A new signal strength record 36 is created, typically initiated when the user 16 interacts with the user interface software. The signal strength record 36 typically includes an indication of the signals 26 and the signal strength 28 of the signals 26 detected by the mobile device 12 at the new location.

Figure 3:
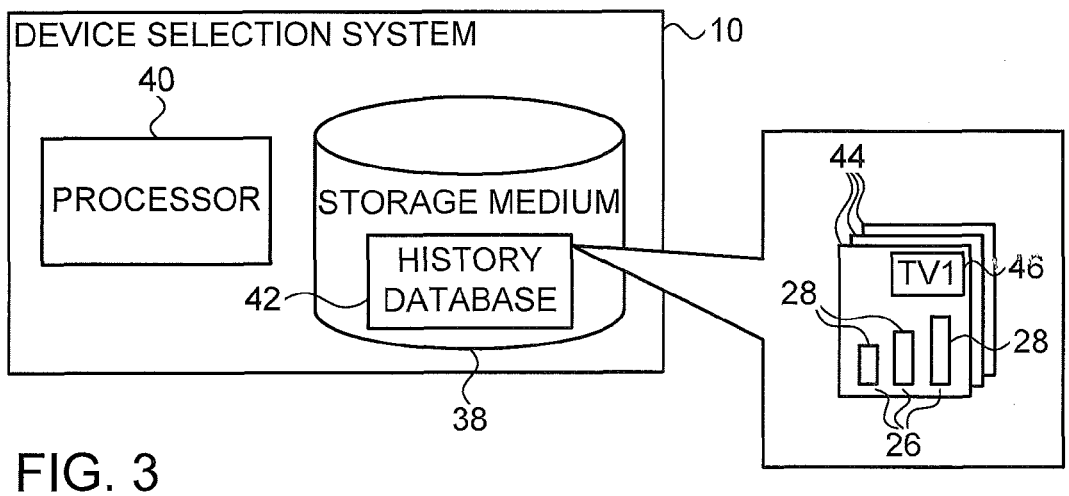
FIG. 3 is a block diagram view of the rendering device selection system of FIG. 1.

Reference is now made to FIG. 3, which is a block diagram view of the rendering device selection system 10 of FIG. 1.

The rendering device selection system 10 typically includes a storage medium 38 and a processor 40.

The processor 40 is operative to maintain a history database 42 in the storage medium 38 for storing a plurality of signal strength history records 44. Each of the signal strength history records 44 typically includes an indication of one or more signals 26 and their signal strength 28 as detected by the mobile device 12 (FIG. 1) at a particular time. Each of the signal strength history records 44 is typically mapped to one of the rendering devices 14 (box 46).

The rendering device selection system 10 may be disposed in the mobile device 12 (FIG. 1) or in one of the rendering devices 14 (FIG. 1) or even in a remote server (not shown) which is remote to the mobile device 12 and the rendering devices 14 but connected via a communication link (e.g. cellular or WiFi) to the mobile device 12 and optionally connected the rendering devices 14. Storing the history database 42 in a centralized place allows the history data to be shared among different mobile devices running their own user interface software for controlling the rendering devices 14. For example, each member of a household may then use their own mobile device to control the rendering devices 14 as directed by the rendering device selection system 10. It should be noted that the history database 42 may be located in the same device as the rendering device selection system 10 or stored remotely, for example, in one of the rendering devices 14 or in the cloud.

Figure 4:
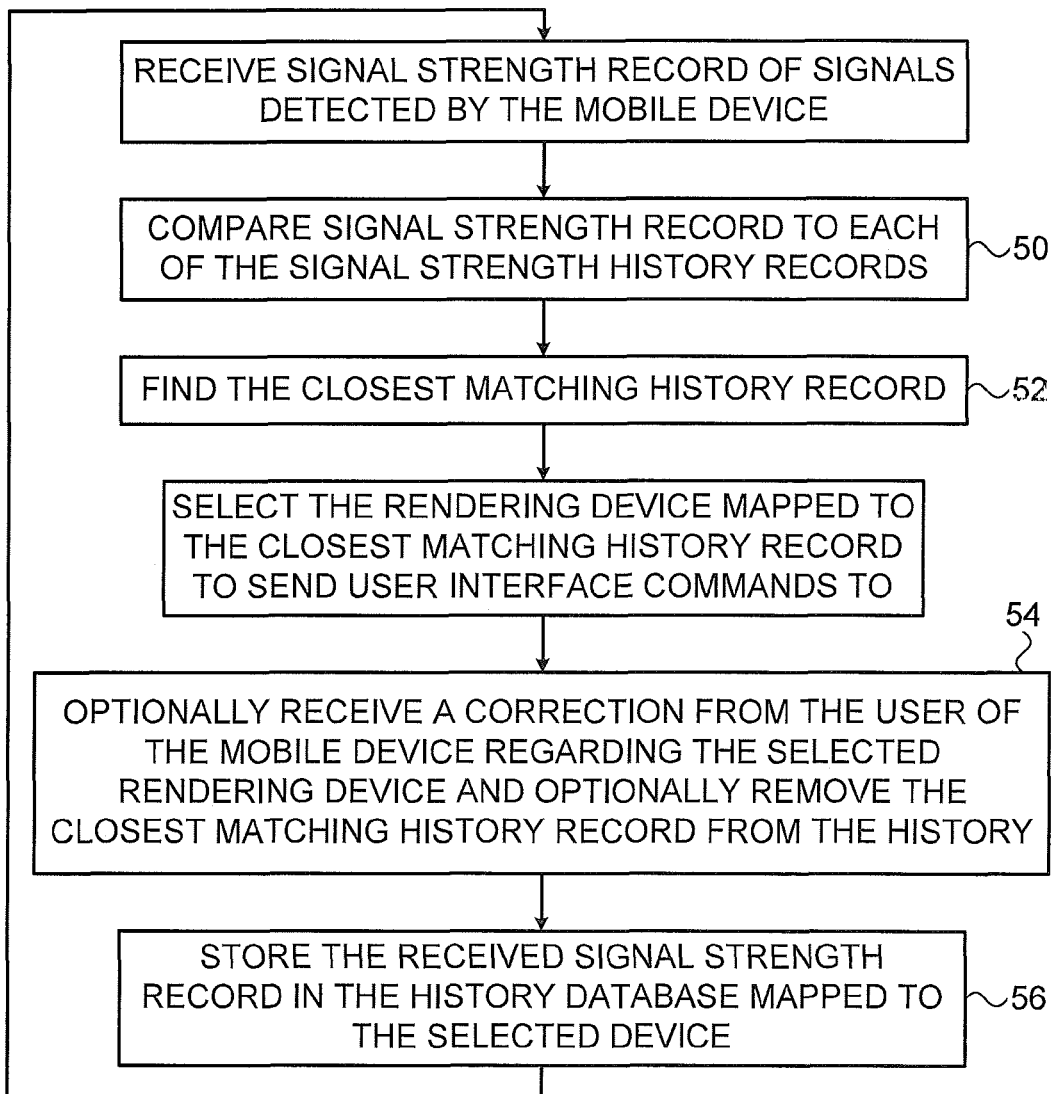
FIG. 4 is a flow chart showing the steps of a selection process performed by the rendering device selection system of FIG. 1.

Reference is now made to FIG. 4, which is a flow chart showing the steps of a selection process performed by the rendering device selection system 10 of FIG. 1. It should be noted that the iterative process of: (a) comparing the newly detected signal strength record 36 (FIG. 2) (block 50) to all, or some, of the records of the history database 42 (FIG. 3) to find a sufficiently close, possibly the closest, match (block 52), (b) optionally receiving corrections from the user 16 (FIG. 2) (block 54), (c) adding the new signal strength record 36 to the history database 42 (block 56) as well as (d) purging old and/or unreliable history records 44 (FIG. 3), lead to fine tuning the selection process by the rendering device selection system 10 (FIG. 3).

The above steps are now described in more detail below with reference to FIGS. 5-9.

Figure 5:
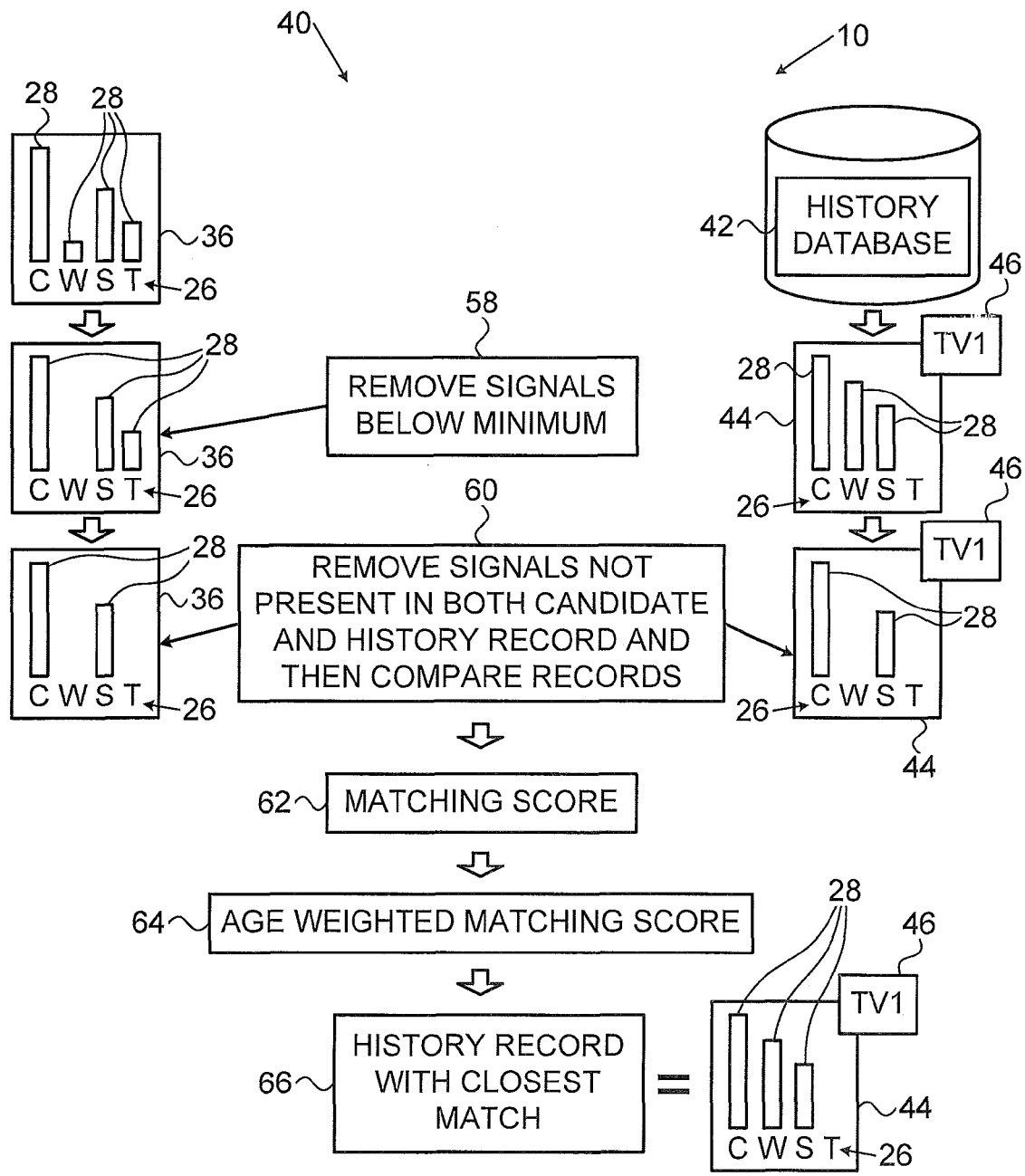
FIG. 5 is a flow chart showing the comparison of a signal strength record with a history record in the system of FIG. 1.

Reference is now made to FIG. 5, which is a flow chart showing the comparison of the signal strength record 36 with one of the history record 44 in the system 10 of FIG. 1.

When the user 16 (FIG. 2) interacts with one of the rendering devices 14 (FIG. 2) from the mobile device 12 (FIG. 2), the mobile device 12 creates the signal strength record 36 including an indication of the signals 26 and the signal strength 28 of the signals 26 as detected by the mobile device 12 at the current time. The signal strength record 36 may include different types of signals as described with reference to FIG. 1. Additionally, the signal strength record 36 may include one or more signals 26. It should be noted that even a single record 36 may be used by the rendering device selection system 10 to determine which rendering device 14 (FIG. 2) should be selected for the user interface software to send the control commands to.

The processor 40 is operative to receive the signal strength record 36.

The processor 40 is operative to have access to the history database 42 of signal strength history records 44 previously detected by the mobile device 12 (FIG. 2) and with each signal strength history record 44 being mapped to one of the rendering devices 14 (FIG. 2) (block 46). The number of signal strength history records 44 stored in the history database 42 could either be globally limited (up to N signal strength history records 44, where N could be 100 or 1000 by way of example only), or have a dedicated limit of M per rendering device 14 (where M could be 20 or 100 by way of example only).

If the history database 42 is empty, it could be pre-populated with one or several known signals associated with wireless transmitters of the rendering devices 14 (FIG. 2) with the signal strength set to the maximum power level of one or more of the wireless access points. Alternatively, if the history database 42 is empty, the first signal strength record 36 could be mapped to one of the rendering devices 14 arbitrarily (according to an ordered list or the TV with the highest wireless signal) or by a guess and the user 16 (FIG. 2) can be allowed to correct the mapping. Alternatively, if the history database 42 is empty, the user 16 can be prompted to select the rendering device 14 thereby providing the mapping for the signal strength record 36 to the selected rendering device 14.

Optionally, the history database 42 can be initially seeded by requiring the user 16 (FIG. 2) to "map" the home by going in front of each rendering device 14 (FIG. 2), and manually indicate which rendering device 14 is the correct one. As the history database 42 is constantly fine-tuned over time the initial mapping by the user 16 may be a very basic mapping, such as once per rendering device 14 or less (e.g. some of the rendering devices 14 could be ignored). In such a way, the history database 42 is seeded, but a detailed mapping of the home by the user 16 is avoided.

The processor 40 is now operative to determine which signal strength history record 44 is sufficiently close, possibly the closest, match with the signal strength record 36. The comparison process is now described in more detail. The requirement for a sufficiently close match is determined based on suitable matching criteria. For example, when a statistical correlation coefficient is calculated, a statistical correlation coefficient of 0.9 or 0.95, for example, may be considered a sufficiently close match. By way of another example, the comparison process may determine the difference between the signal strength 28 of each individual signal 26 in the signal strength record 36 and the corresponding signal strength 28 in the signal strength history record 44. If the difference is less than a certain percentage, such as 10% or 20%, then the difference may be considered sufficiently small in order to indicate a match.

The processor 40 is operative to compare the signal strength record 36 to (all or some) of each of the signal strength history records 44 to find the signal strength history record 44 having a sufficiently close, possibly the closest, match with the signal strength record 36.

The comparison may be performed by computing the statistical correlation coefficient for (all or some of) each signal strength history records 44 with the signal strength record 36, and selecting the signal strength history record 44 having the correlation value which is closest to 1 or deemed to be close enough to 1, for example, but not limited to 0.9.

The comparison may include computing the sum of absolute differences (SAD) between the signal strength record 36 and (all or some of) each of the signal strength history records 44, and selecting the signal strength history record 44 having the lowest, or sufficiently low, sum of absolute differences compared to the values from the signal strength record 36. The threshold of "sufficiently low" may depend on various factors including, but not limited to, the number of wireless/cellular signals that need to be compared, the signal strength 28 of the individual signals 26 of the signal strength record 36 and the maximum signal strength 28 of the signals 26 of the signal strength record 36.

The comparison may include computing the sum of squared errors (SSE) between the signal strength record 36 and (all or some of) each of the signal strength history records 44, and selecting the signal strength history record 44 having the lowest, or sufficiently low, sum of squared errors compared to the values from the signal strength record 36. The threshold of "sufficiently low" may depend on various factors including, but not limited to, the number of wireless/cellular signals that need to be compared, the signal strength 28 of the individual signals 26 of the signal strength record 36 and the maximum signal strength 28 of the signals 26 of the signal strength record 36.

The comparison may include computing the median error between the signal strength record 36 and (all or some of) each of the signal strength history records 44, and selecting the signal strength history record 44 having the lowest, or sufficiently low, median error compared to the values from the signal strength record 36. The threshold of "sufficiently low" may depend on various factors including, but not limited to, the number of wireless/cellular signals that need to be compared, the signal strength 28 of the individual signals 26 of the signal strength record 36 and the maximum signal strength 28 of the signals 26 of the signal strength record 36.

All the above comparison methods, apart from SAD, compare the "pattern" or "form" of the signal strengths as a whole whereby the signal strength 28 of each signal type in the signal strength record 36 is compared to the signal strength 28 of the same signal type in the signal strength history record 44. The SAD method is generally quicker to compute, but it is generally less accurate. It may be possible to use the SAD method as a first run estimation and then another comparison method for a more accurate comparison if need be.

The above comparison process may include some optional pre-filtering stages as well as age weighting as described in more detail below.

The processor 40 is optionally operative to remove the signals 26 with a signal strength 28 below a minimal signal strength from the signal strength record 36 prior to comparing the signal strength record 36 to (all or some of) each of the signal strength history records 44 in order to reduce computations and/or to avoid using signals 26 which are not reliable enough to be used for geolocation (block 58).

For (all or some of) each signal strength history record 44, the processor 40 is optionally operative to perform the following. The processor 40 is operative when comparing the signal strength record 36 to one of the signal strength history records 44, to filter out the signals 26 from the signal strength record 36 and from the signal strength history record 44 (being compared) which are not present in both the signal strength record 36 and the signal strength history record 44 (being compared) when performing the comparison (block 60). The purpose of the above filtering is to avoid issues with wireless signals which may have either appeared or disappeared between the time when the signal strength history record 44 was written to the history database 42 and when the signal strength record 36 was created.

The processor 40 is operative, for (all or some of) each signal strength history records 44, when comparing the signal strength record 36 to the signal strength history records 44, to yield a matching score 62 of the closeness of the match between the signal strength record 36 and the signal strength history records 44.

Age-based weighting can be applied to the comparison process, in order to positively bias the comparison toward more recent signal strength history records 44. The processor 40 is operative to reduce the matching score 62 according to an age of the signal strength history record 44 in the history database 42 yielding an age-weighted matching score 64 in order to provide age based weighting when determining the signal strength history record 44 which has a sufficiently close, or possibly the closest, match to the signal strength record 36.

Optionally, signal strength history records 44 older than a pre-defined age can be discarded when performing the comparison.

The above process identifies the signal strength history record 44 with the best match (age-weighted if relevant) to the signal strength record 36 (block 66).

The rendering device 14 (FIG. 2) mapped to the signal strength history record 44 with the sufficiently close, or closest, match to the signal strength record 36, taking into account age weighting, if relevant, is determined to be the rendering device 14 that the user 16 (FIG. 2) desires to interact with (block 66). In the example of FIG. 5, the closest matching signal strength history record 44 is mapped to the WiFi enabled set-top box 18 (denoted "TV1") (FIG. 2) (block 46) in the history database 42.

Figure 6:
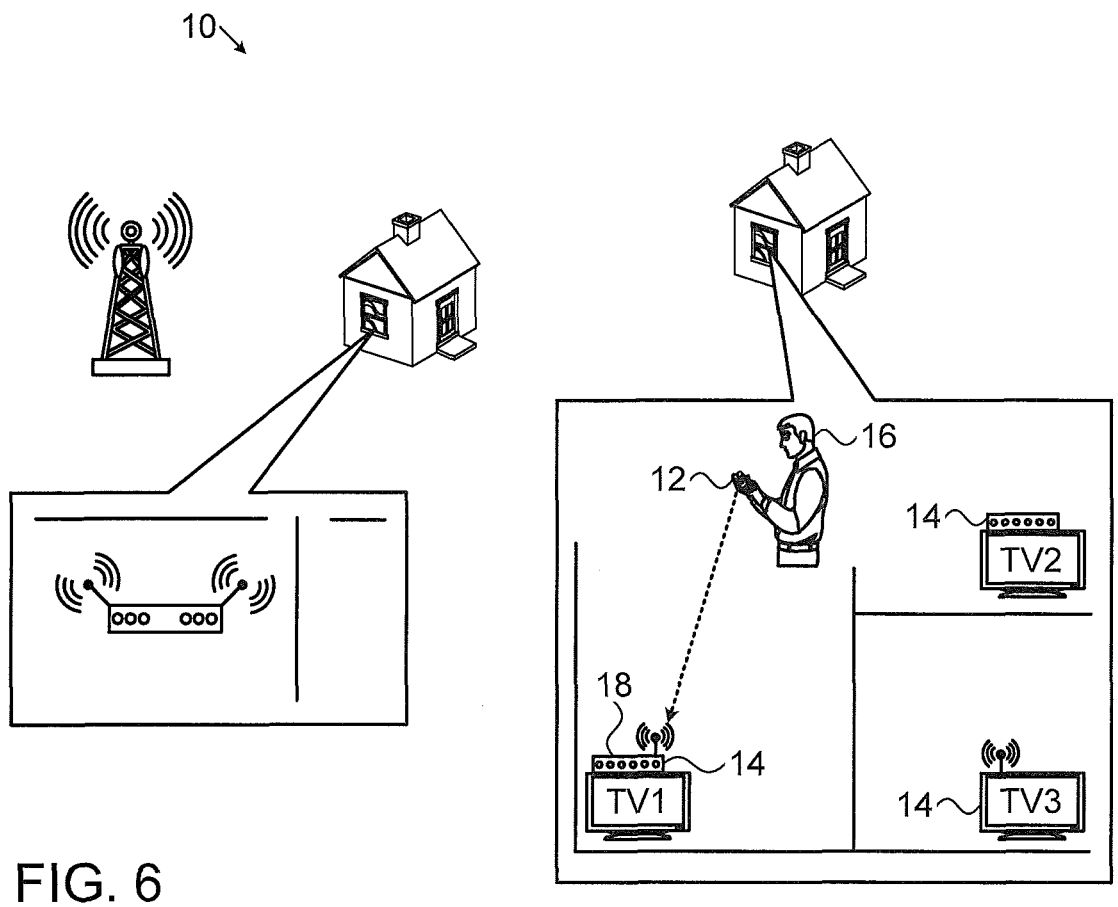
FIG. 6 is a partly pictorial, partly block diagram view of the selection of one of the rendering devices in the system of FIG. 1.

Reference is now made to FIG. 6, which is a partly pictorial, partly block diagram view of the selection of one of the rendering devices 14 in the system 10 of FIG. 1.

As stated above, in the example of FIG. 5, the closest matching signal strength history record 44 (FIG. 5) is mapped to the WiFi enabled set-top box 18 (denoted "TV1") in the history database 42 (FIG. 5). Therefore, the processor 40 (FIG. 5) is operative to select the WiFi enabled set-top box 18 (denoted "TV1") for the user interface software to send the control commands to.

When the rendering device selection system 10 is not disposed in the mobile device 12, the processor 40 (FIG. 5) is operative to send a message to the mobile device 12 informing the user interface software that the WiFi enabled set-top box 18 (denoted "TV1") has been selected for the user interface software to send the control commands to.

When the rendering device selection system 10 is disposed in the mobile device 12, the processor 40 (FIG. 5) is typically operative to send control commands generated by the user interface software to the selected rendering device (in this case the WiFi enabled set-top box 18 (denoted "TV1")).

It should be noted that in the comparison and selection process described with reference to FIGS. 5 and 6, the processor 40 (FIG. 5) is operative to select the rendering device 14 for the user interface software to send the control commands to without first determining the location of the mobile device 12. Additionally, the processor 40 is operative to select the rendering device 14 for the user interface software to send the control commands to without knowledge of any floor plan in the region that the mobile device 12 is roaming in.

Figure 7:
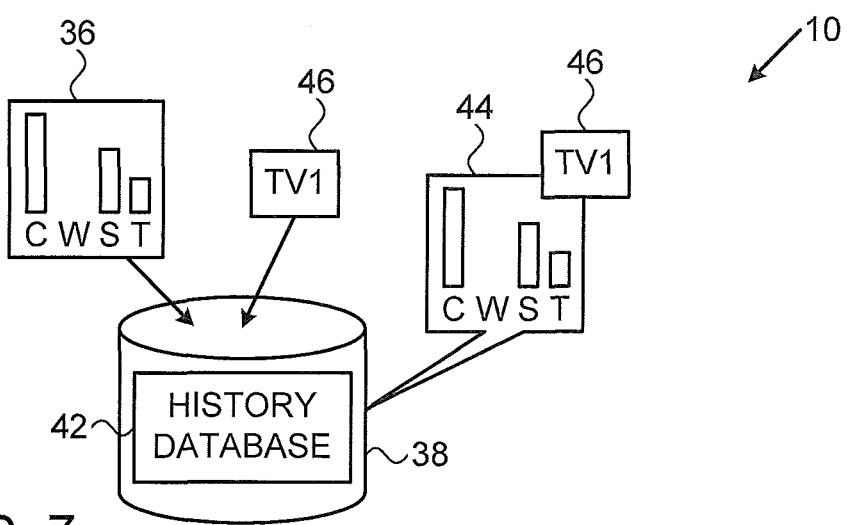
FIG. 7 is a partly pictorial, partly block diagram view of the history database being updated in the system of FIG. 1.

Reference is now made to FIG. 7, which is a partly pictorial, partly block diagram view of the history database 42 being updated in the system 10 of FIG. 1.

The processor 40 (FIG. 3) is operative to store the signal strength record 36 in the history database 42 as one of the signal strength history records 44. The processor 40 is operative to map the signal strength record 36 to the selected rendering device, the WiFi enabled set-top box 18 (FIG. 6) (denoted "TV1" and block 46), in the history database 42. The storage of the signal strength record 36 in the history database 42 may be delayed for a certain time (10 seconds to 1 minute, by way of example only) in order to allow the user 16 (FIG. 2) time to correct the selection of the rendering device 14 made by the rendering device selection system 10.

If when adding the signal strength record 36 to the history database 42, the history is full, one of the signal strength history records 44 is removed in order to make room for the signal strength record 36. Several schemes can be used in order to determine which signal strength history record 44 to remove, such as removing the oldest signal strength history record 44, in other words on a FIFO basis. The FIFO purging could be per rendering devices 14 (FIG. 6) or independent of the rendering devices 14. So for example, if the added signal strength record 36 is mapped to TV1 then the purged signal strength history record 44 will also be mapped to TV1. Alternatively, if the added signal strength record 36 is mapped to TV1 then the purged signal strength history record 44 may be mapped to TV2 if that is the oldest signal strength history record 44.

Purging the signal strength history records 44 could be performed by trying to retain the more reliable signal strength history records 44 for example by considering how often a match has been corrected or not by the user 16 (FIG. 3) or how often each of the signal strength history records 44 is found to be sufficiently close, or the closest, matching signal strength history record 44.

Purging old signal strength history records 44 is general necessary (even without considering available space in the storage medium 38) due to changes in wireless transmitters (wireless transceiver 32 (FIG. 1), wireless router 30 (FIG. 1), and cellular communication tower 24 (FIG. 1)) for example, but not limited to, moving the wireless router 30 around the home.

A new signal strength record 36 is typically created by the mobile device 12 (FIG. 2) every time the user 16 interacts with the user interface software. The minimum time interval between creating one signal strength record 36 and another one may be limited to a certain value, for example, but not limited to, one or two seconds.

Figure 8:
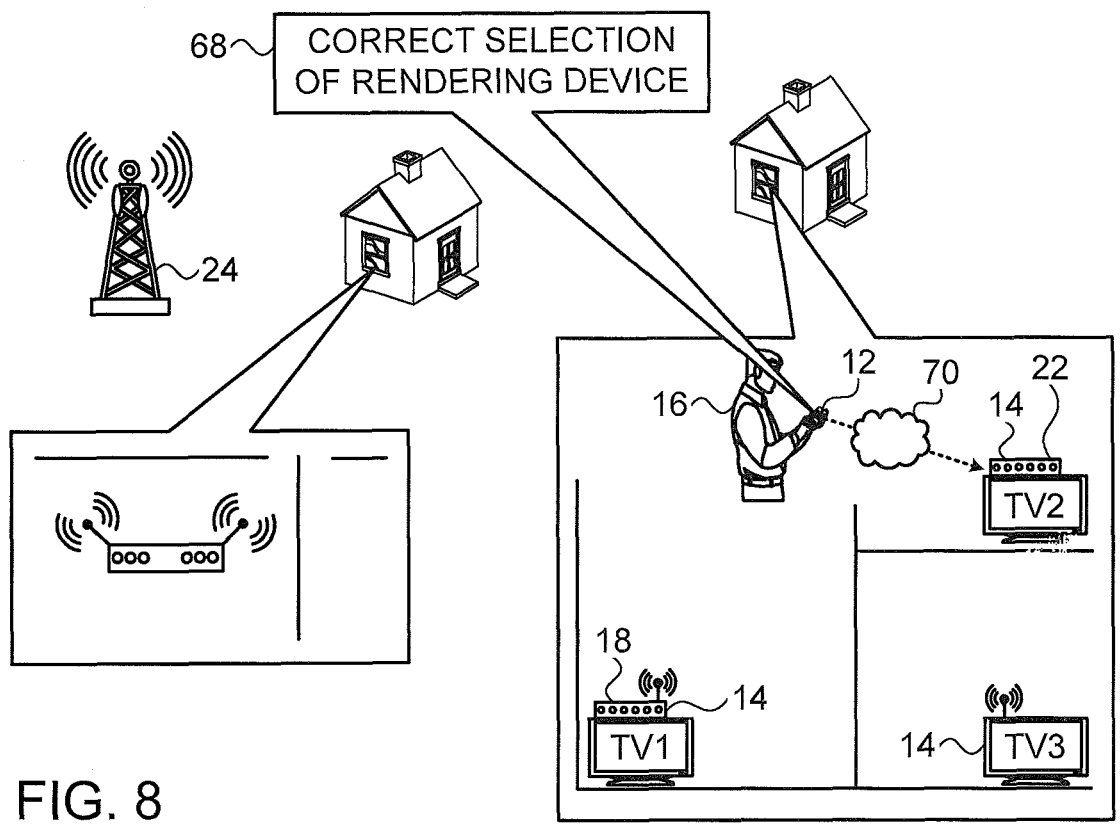
FIG. 8 is partly pictorial, partly block diagram view of the selection of the rendering device of FIG. 6 being corrected by the user.

Reference is now made to FIG. 8, which is partly pictorial, partly block diagram view of the selection of the rendering device 14 of FIG. 6 being corrected by the user 16.

The mobile device 12 includes an interface for the user 16 to correct the selection of the rendering device 14 made by the rendering device selection system 10 (block 68).

The processor 40 (FIG. 3) is operative to receive a correction from the user 16 of the mobile device 12 to select a different rendering device 14 (the internet enabled set-top box 22 associated with "TV2") instead of the WiFi enabled set-top box 18 ("TV1") for the user interface software to send the control commands to.

Then, the mobile device 12 is operative to send the control commands generated by the user interface software to the newly selected rendering device 14 (the internet enabled set-top box 22 associated with "TV2") via an Internet connection 70 (or any suitable network, for example, but not limited to, a LAN). The mobile device 12 may be connected to the Internet connection 70 (or LAN) via a cellular connection to the cellular communication tower 24 or via a WiFi connection which is then operationally connected to the Internet (or LAN).

Figure 9:
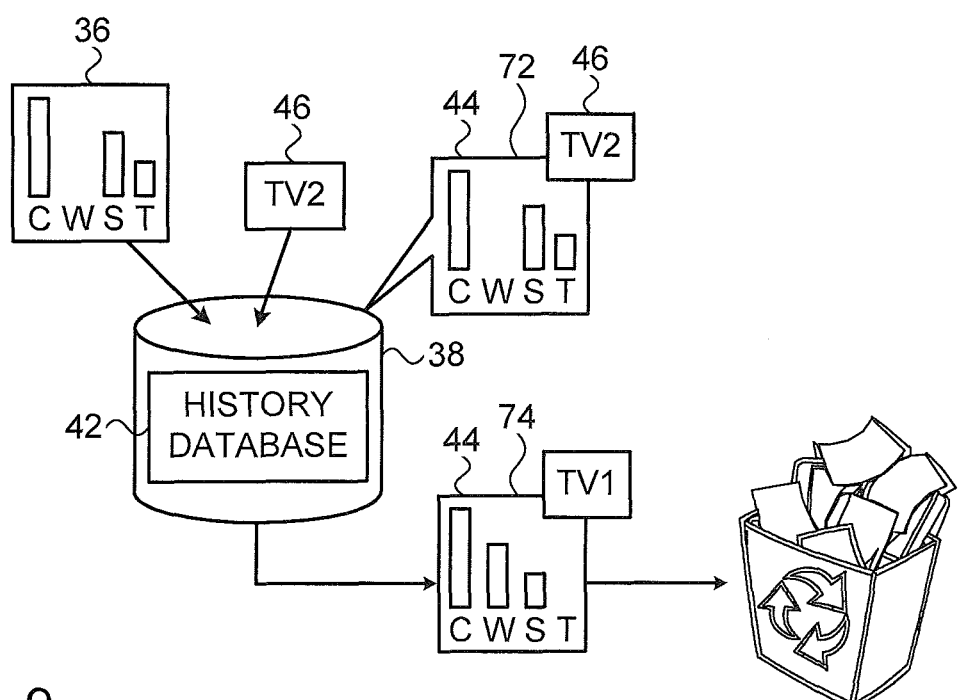
FIG. 9 is a partly pictorial, partly block diagram view of the history database being updated based on the correction of FIG. 8.

Reference is now made to FIG. 9, which is a partly pictorial, partly block diagram view of the history database 42 being updated based on the correction of FIG. 8.

If the signal strength record 36 has already been stored as in the history database 42 as one of the signal strength history records 44 (a signal strength history record 72), the processor 40 (FIG. 3) is operative to remap the signal strength record 36 newly stored in the history database 42 to the internet enabled set-top box 22 ("TV2") (block 46) (FIG. 8) instead of the WiFi enabled set-top box 18 ("TV1") (FIG. 8) in the history database 42.

If the signal strength record 36 has not yet been stored as in the history database 42 as a signal strength history record 44, the processor 40 (FIG. 3) is operative to store the signal strength record 36 in the history database 42 with a mapping to the internet enabled set-top box 22 ("TV2") (FIG. 8) (block 46).

Optionally, the processor 40 (FIG. 3) is operative to remove the signal strength history record 44 (also labeled with reference numeral 74) found to have the sufficiently close, or closest, match to the signal strength record 36 from the history database 42 following the correction by the user 16 (FIG. 8).

It can now be seen that the rendering device selection system 10 does not need to rely on an initial mapping process or knowledge of a floor plan, is robust against appearance and disappearance of wireless signals, can use any type of wireless signal available detectable by the mobile device 12 (FIG. 2), and is self-adjusting and has increasing reliability due to the history database 42 being constantly updated.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system in an environment including a mobile device and a plurality of rendering devices located in a plurality of different locations, the mobile device including user interface software for sending control commands to any one of the rendering devices, the mobile device being operative to detect wireless signals and a signal strength of each of the wireless signals, the system comprising a processor to:
    maintain a history database in a storage medium for storing a plurality of rendering-device-mapped signal strength history records, each of the rendering-device-mapped signal strength history records including: an indication of one or more signals and a signal strength for each of the one or more signals detected by the mobile device at a particular time, each of the rendering-device-mapped signal strength history records being mapped to one of the rendering devices;
    receive a first signal strength record of one or more signals as detected by the mobile device;
    compare the first signal strength record to at least some of the rendering-device-mapped signal strength history records to find one of the at least some rendering-device-mapped signal strength history records which is a matching rendering-device-mapped signal strength history record with the first signal strength record matched based on matching criteria, wherein the matching rendering-device-mapped signal strength history record is mapped to a first one of the rendering devices in the history database;
    select the first rendering device for the user interface software to send the control commands to; and
    store the first signal strength record in the history database as one of the rendering-device-mapped signal strength history records, the first signal strength record being mapped to the selected rendering device in the history database.

2. The system according to claim 1, wherein the processor is operative to select the first rendering device for the user interface software to send the control commands to without first determining the location of the mobile device.

3. The system according to claim 1, wherein the processor is operative to select the first rendering device for the user interface software to send the control commands to without knowledge of any floor plan in the region that the mobile device is roaming in.

4. The system according to claim 1, wherein the processor is operative to receive a correction from a user of the mobile device to select a second one of the rendering devices instead of the first rendering device for the user interface software to send the control commands to.

5. The system according to claim 4, wherein the processor is operative to map the first signal strength record to the second rendering device instead of the first rendering device in the history database.

6. The system according to claim 4, wherein the matching signal strength history record is removed from the history database following the correction by the user.

7. The system according to claim 1, wherein the signals of the first signal strength record include a cellphone tower signal.

8. The system according to claim 1, wherein the mobile device is operative to send the control commands to the rendering devices via a network connection.

9. The system according to claim 1, wherein the processor is operative to remove the signals below a minimal signal strength from the first signal strength record prior to comparing the first signal strength record to each of the at least some rendering-device-mapped signal strength history records.

10. The system according to claim 1,
    wherein the processor is operative, for each one of the at least some rendering-device-mapped signal strength history records, when comparing the first signal strength record to the one rendering-device-mapped signal strength history record, to filter out the signals from the first signal strength record and from the one rendering-device-mapped signal strength history record which are not present in both the first signal strength record and the one rendering-device-mapped signal strength history record when performing the comparison.

11. The system according to claim 1, wherein the processor is operative, for each one of the at least some rendering-device-mapped signal strength history records, when comparing the first signal strength record to the one rendering-device-mapped signal strength history record, to yield a matching score of the closeness of the match between the first signal strength record and the one rendering-device-mapped signal strength history record, the processor being operative to reduce the matching score according to an age of the one rendering-device-mapped signal strength history record in the history database in order to provide age based weighting when determining which one of the at least some rendering-device-mapped signal strength history records matches the first signal strength record according to the matching criteria.

12. The system according to claim 1, wherein the system is disposed in the mobile device.

13. The system according to claim 12, wherein the processor is operative to send control commands generated by the user interface software to the selected rendering device.

14. The system according to claim 1, wherein the system is disposed in one of the rendering devices.

15. The system according to claim 1, wherein the system is disposed in a server remote to the mobile device and the rendering devices.

16. The system according to claim 1, wherein the processor is operative to send a message to the mobile device informing the user interface software that the first rendering device has been selected for the user interface software to send the control commands to.

17. The system according to claim 1, wherein the matching rendering-device-mapped signal strength history record is a closest matching one of the at least some rendering-device-mapped signal strength history records with the first signal strength record.

18. A method in an environment including a mobile device and a plurality of rendering devices located in a plurality of different locations, the mobile device including user interface software for sending control commands to any one of the rendering devices, the mobile device being operative to detect wireless signals and a signal strength of each of the wireless signals, the method comprising:

creating a history database in the storage medium for storing a plurality of rendering-device-mapped signal strength history records, each of the rendering-device-mapped signal strength history records including: an indication of one or more signals and a signal strength for each of the one or more signals detected by the mobile device at a particular time, each of the rendering-device-mapped signal strength history records being mapped to one of the rendering devices;

receiving a first signal strength record of one or more signals as detected by the mobile device;

comparing the first signal strength record to at least some of the rendering-device-mapped signal strength history records to find one of the at least some rendering-device-mapped signal strength history records which is a matching rendering-device-mapped signal strength history record with the first signal strength record matched based on matching criteria, wherein the matching rendering-device-mapped signal strength history record is mapped to a first one of the rendering devices in the history database;

selecting the first rendering device for the user interface software to send the control commands to; and storing the first signal strength record in the history database as one of the rendering-device-mapped signal strength history records, the first signal strength record being mapped to the selected rendering device in the history database.

* * * * *